United States Patent
Wallace et al.

(10) Patent No.: US 8,615,053 B2
(45) Date of Patent: Dec. 24, 2013

(54) MODE AND RATE CONTROL FOR MIMO TRANSMISSION

(75) Inventors: Mark S Wallace, Bedford, MA (US); J Rodney Walton, Carlisle, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/277,444

(22) Filed: Oct. 20, 2011

(65) Prior Publication Data

US 2012/0033618 A1 Feb. 9, 2012

Related U.S. Application Data

(63) Continuation of application No. 11/750,766, filed on May 18, 2007, now Pat. No. 8,102,944.

(51) Int. Cl.
*H04B 7/02* (2006.01)
*H04L 1/02* (2006.01)

(52) U.S. Cl.
USPC .......................................................... 375/267

(58) Field of Classification Search
USPC ......... 375/219, 220, 227, 259, 260, 267, 295, 375/299, 316, 341, 343; 370/203, 229, 280, 370/329, 338, 341
See application file for complete search history.

(56) References Cited

U.S. PATENT DOCUMENTS

| | | |
|---|---|---|
| 8,102,944 B2 | 1/2012 | Wallace et al. |
| 2003/0235147 A1 | 12/2003 | Walton et al. |
| 2004/0146018 A1 | 7/2004 | Walton et al. |
| 2005/0135318 A1 | 6/2005 | Walton et al. |
| 2005/0249159 A1 | 11/2005 | Abraham et al. |
| 2005/0250544 A1* | 11/2005 | Grant et al. ................. 455/562.1 |
| 2005/0270975 A1* | 12/2005 | Meylan et al. ................. 370/229 |
| 2006/0104340 A1 | 5/2006 | Walton et al. |
| 2006/0114858 A1 | 6/2006 | Walton et al. |
| 2006/0160556 A1* | 7/2006 | Mueller et al. ................. 455/522 |
| 2006/0193268 A1 | 8/2006 | Walton et al. |
| 2006/0256761 A1 | 11/2006 | Meylan et al. |

OTHER PUBLICATIONS

IEEE 802.11, IEEE Standard for Information Technology—Telecommunications and information exchange between systems—Local and metropolitan area networks—Specific requirements; Part 11: Wireless LAN Medium Acess Control (MAC) and Physical Layer (PHY), 2007.

information exchange between systems—Local and metropolitan area networks—Specific requirements; Part 11: Wireless LAN Medium Access Control (MAC) and Physical Layer (PHY), 2007.

* cited by examiner

*Primary Examiner* — Sam K Ahn
*Assistant Examiner* — Syed Haider
(74) *Attorney, Agent, or Firm* — QUALCOMM IP Department; James Hunt Yancey, Jr.

(57) ABSTRACT

Techniques for performing mode and rate control for a MIMO transmission are described. For mode selection, the use of an eigensteering mode is permitted if a first set of at least one criterion is satisfied. The eigensteering mode is selected for data transmission if a second set of at least one criterion is satisfied, and an unsteered mode is selected otherwise. For rate selection, SNR estimates are derived for data streams to potentially transmit, e.g., based on channel estimates and/or data symbol estimates. The number of data streams to transmit as well as at least one rate for at least one data stream to transmit are selected based on the SNR estimates and at least one backoff factor. The backoff factor(s) are adjusted based on status of received packets. The at least one rate may be adjusted based on the age of rate information. Other aspects, features, and embodiments are also claimed and described.

34 Claims, 8 Drawing Sheets

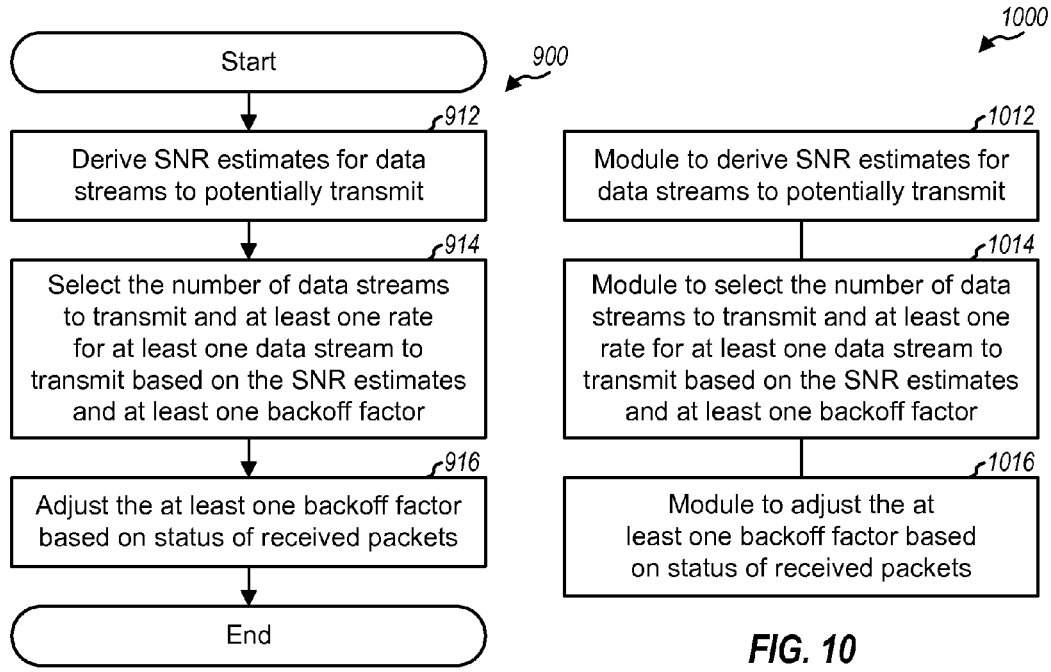
FIG. 9
FIG. 10
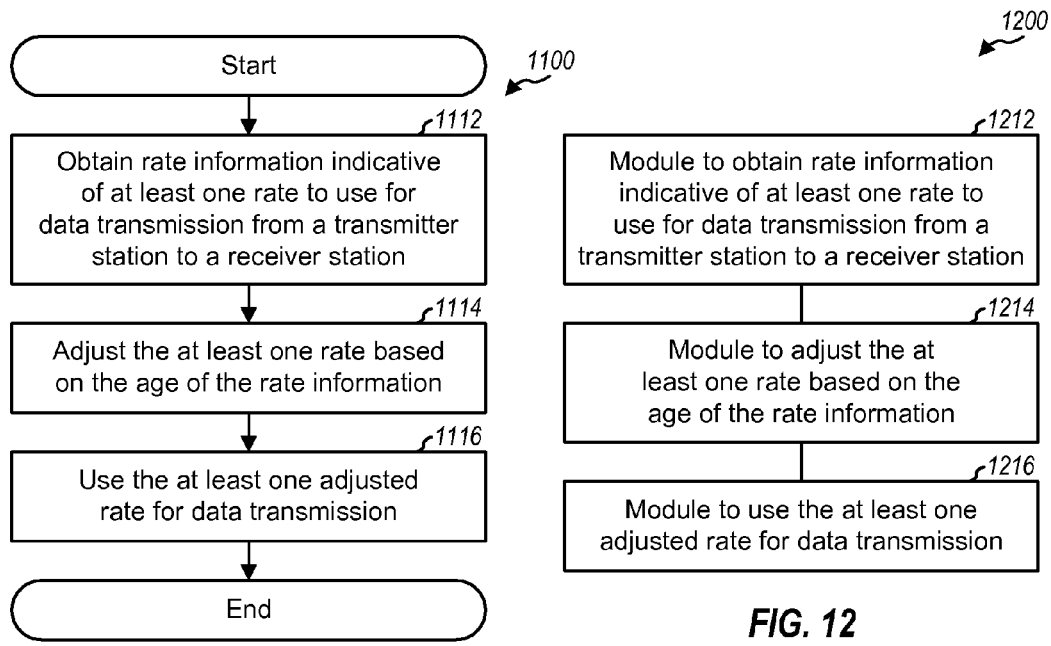
FIG. 11
FIG. 12

MODE AND RATE CONTROL FOR MIMO TRANSMISSION

CLAIM OF PRIORITY UNDER 35 U.S.C. §120

The present application for patent is a continuation of patent application Ser. No. 11/750,766, entitled "MODE AND RATE CONTROL FOR MIMO TRANSMISSION" filed May 18, 2007, pending, and is assigned to the assignee hereof and incorporated herein by reference.

TECHNICAL FIELD

The present disclosure relates generally to communication, and more specifically to techniques for controlling a multiple-input multiple-output (MIMO) transmission.

BACKGROUND

In a wireless communication system, a transmitter station may utilize multiple (T) transmit antennas for data transmission to a receiver station equipped with multiple (R) receive antennas. The multiple transmit and receive antennas form a MIMO channel that may be used to increase throughput and/or improve reliability. For example, the transmitter station may transmit up to T data streams simultaneously from the T transmit antennas to improve throughput. Alternatively, the transmitter station may transmit a single data stream from all T transmit antennas to improve reception by the receiver station.

The MIMO channel may be decomposed into S spatial channels, where S≤min {T, R}. Each spatial channel may experience various deleterious channel conditions such as, e.g., fading, multipath, and interference effects. The S spatial channels may experience different channel conditions and may achieve different received signal qualities, which may be quantified by signal-to-noise-and-interference ratios (SNRs) or some other measure. The SNR of each spatial channel determines its transmission capacity, which is typically quantified by a particular data rate that may be reliably sent on the spatial channel. For a time variant MIMO channel, the channel conditions change over time and the SNR of each spatial channel also changes over time. The different SNRs for different spatial channels plus the time varying nature of the SNR of each spatial channel make it challenging to control a MIMO transmission.

There is therefore a need in the art for techniques to control a MIMO transmission.

SUMMARY OF EXEMPLARY EMBODIMENTS

Techniques for performing mode and rate control for a MIMO transmission are described herein. In one design of mode selection, the use of an eigensteering mode is permitted if a first set of at least one criterion is satisfied. The first set of at least one criterion may be satisfied, e.g., if eigensteering is supported by a transmitter station and a receiver station and if calibration is performed within a predetermined time period. The eigensteering mode is selected for data transmission if a second set of at least one criterion is satisfied, and an unsteered mode is selected otherwise.

In one design of rate selection, SNR estimates are derived for data streams to potentially transmit, e.g., based on channel estimates and/or data symbol estimates. The number of data streams to transmit as well as at least one rate for at least one data stream to transmit are selected based on the SNR estimates and at least one backoff factor. The backoff factor(s) are adjusted based on status of received packets.

In one design of rate adjustment, rate information indicative of at least one rate to use for data transmission from the transmitter station to the receiver station is obtained. The at least one rate is adjusted based on the age of the rate information. The at least one adjusted rate is used for data transmission.

Various aspects and features of the invention are described in further detail below.

BRIEF DESCRIPTION OF THE DRAWINGS

FIG. 9 shows a process for performing rate selection.

FIG. 10 shows an apparatus for performing rate selection.

FIG. 11 shows a process for performing rate adjustment.

FIG. 12 shows an apparatus for performing rate adjustment.

DETAILED DESCRIPTION OF SOME EXEMPLARY EMBODIMENTS

The techniques described herein may be used for MIMO transmission in various wireless communication networks such as wireless local area networks (WLANs), wireless wide area networks (WWANs), wireless metropolitan area networks (WMANs), etc. The terms "network" and "system" are often used interchangeably. A WLAN may implement one or more standards in the IEEE 802.11 family of standards. A WWAN may be a Code Division Multiple Access (CDMA) network, a Time Division Multiple Access (TDMA) network, a Frequency Division Multiple Access (FDMA) network, an Orthogonal FDMA (OFDMA) network, a Single-Carrier OFDM (SC-FDMA) network, etc. For clarity, the techniques are described below for an IEEE 802.11 WLAN.

Figure 1:
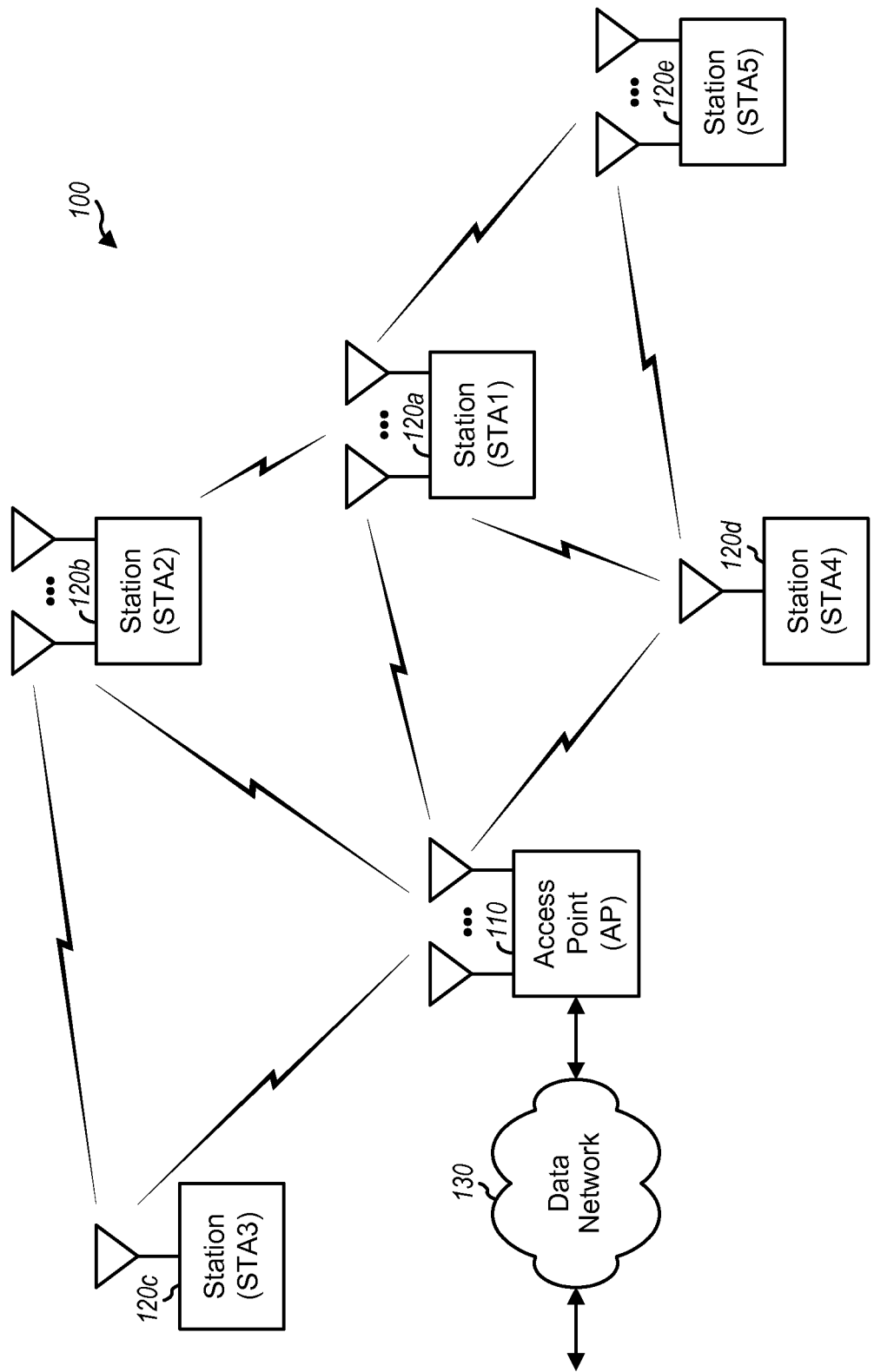
FIG. 1 shows a wireless network with an access point and multiple stations.

FIG. 1 shows a wireless network 100 with an access point (AP) 110 and multiple stations (STAs) 120a through 120e. In general, a wireless network may include any number of access points and any number of stations. A station is a device that can communicate with another station via a wireless medium. A station may also be called, and may contain some or all of the functionality of, a terminal, a mobile station, a user equipment, a subscriber station, and/or some other entity. A station may be a cellular phone, a handheld device, a wireless device, a personal digital assistant (PDA), a laptop computer, a wireless modem card, a cordless phone, and so on. An access point is a station that provides access to distribution services via the wireless medium for stations associated with that access point. An access point may also be called, and may contain some or all of the functionality of, a base station, a base transceiver subsystem (BTS), a Node B, and/or some other network entity. Access point 110 may couple to a data network 130 and may communicate with other devices via network 130.

Figure 2:
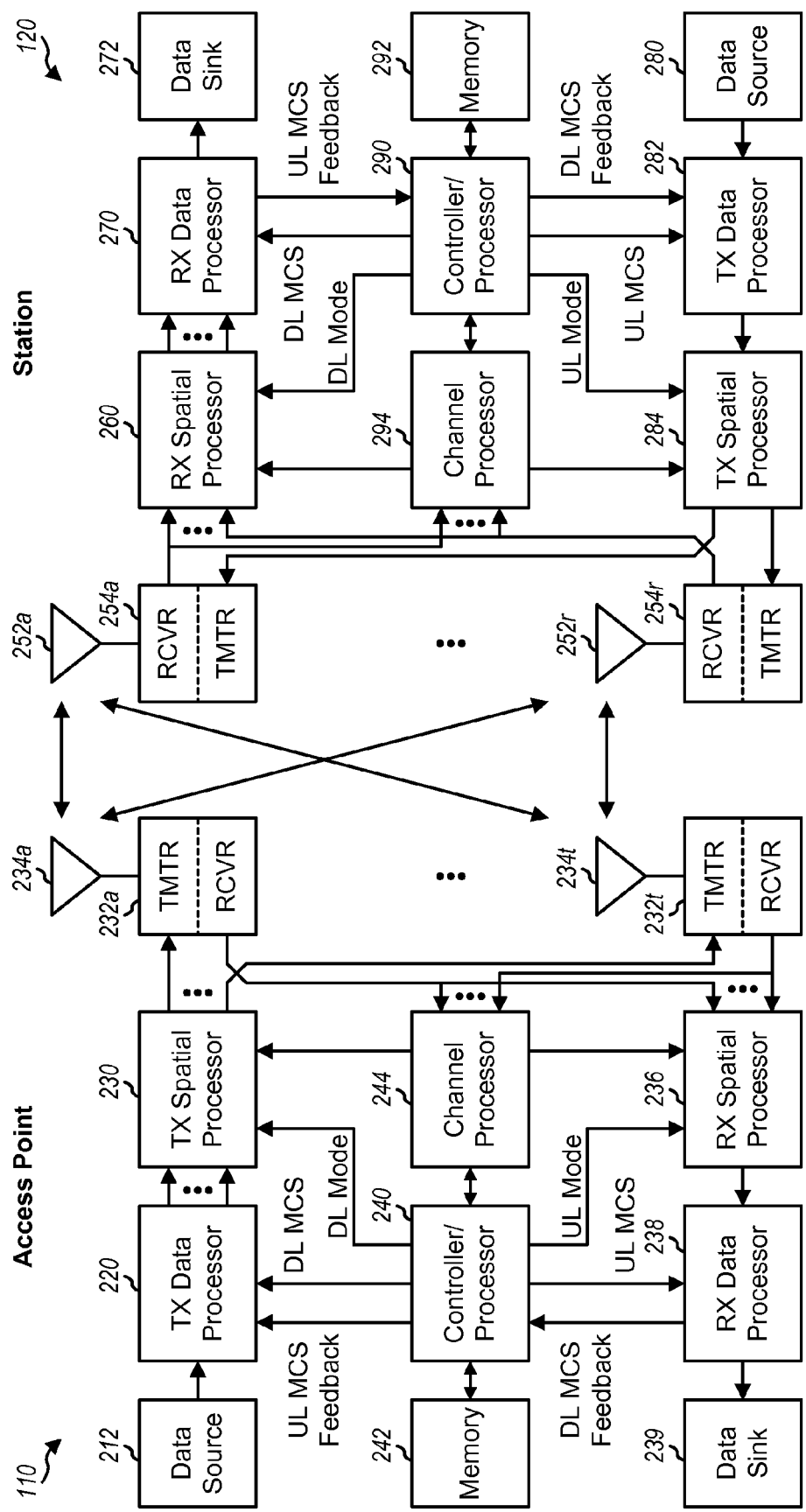
FIG. 2 shows a block diagram of the access point and a station.

FIG. 2 shows a block diagram of a design of access point 110 and station 120. Station 120 may be any of the stations shown in FIG. 1. Access point 110 is equipped with multiple (T) antennas, and station 120 is equipped with multiple (R) antennas. Each antenna may be a physical antenna or an antenna array.

At access point 110, a transmit (TX) data processor 220 receives traffic data from a data source 212, processes (e.g., formats, encodes, interleaves, and symbol maps) the traffic data in accordance with a modulation coding scheme (MCS), and generates data symbols. A data symbol is a symbol for data, a pilot symbol is a symbol for pilot, and a symbol is typically a complex value. The data symbols and pilot symbols may be modulation symbols from a modulation scheme such as PSK or QAM. Pilot is data that is known a priori by both a transmitter station and a receiver station. An MCS may indicate a data rate or information bit rate, a coding scheme or code rate, a modulation scheme, a packet size, and/or other parameters. An MCS may also be referred to as a rate set, a data rate vector (DRV), a packet format, or some other terminology. TX data processor 220 demultiplexes the data symbols into M streams, where 1≤M≤T and determined by the MCS. The M data symbol streams may also be referred to as spatial streams, data streams, output streams, and so on.

A TX spatial processor 230 multiplexes pilot symbols with the data symbols, performs transmitter spatial processing on the multiplexed data symbols and pilot symbols, and provides T output symbol streams to T transmitters (TMTR) 232a through 232t. Each transmitter 232 processes (e.g., modulates, converts to analog, filters, amplifies, and upconverts) its output symbol stream and generates a downlink signal. T downlink signals from transmitters 232a through 232t are transmitted from antennas 234a through 234t, respectively.

At station 120, R antennas 252a through 252r receive the T downlink signals, and each antenna 252 provides a received signal to a respective receiver (RCVR) 254. Each receiver 254 processes (e.g., filters, amplifies, downconverts, digitizes, and demodulates) its received signal, provides received data symbols to a receive (RX) spatial processor 260, and provides received pilot symbols to a channel processor 294. Channel processor 294 estimates the downlink channel response based on the received pilot symbols and provides channel estimates to RX spatial processor 260. RX spatial processor 260 performs MIMO detection on the received data symbols with the channel estimates and provides data symbol estimates. An RX data processor 270 further processes (e.g., deinterleaves and decodes) the data symbol estimates and provides decoded data to a data sink 272.

Station 120 may evaluate the downlink channel conditions and send feedback information to access point 110. The feedback information may comprise the MCS, a transmission mode, packet status, other types of information, or a combination thereof. The feedback information and traffic data from a data source 280 are processed by a TX data processor 282, multiplexed with pilot symbols and spatially processed by a TX spatial processor 284, and further processed by transmitters 254a through 254r to generate R uplink signals, which are transmitted via antennas 252a through 252r.

At access point 110, the uplink signals are received by T antennas 234a through 234t, processed by receivers 232a through 232t, spatially processed by an RX spatial processor 236, and further processed by an RX data processor 238 to recover the feedback information and traffic data sent by station 120. A channel processor 244 estimates the uplink channel response based on the received pilot symbols and provides channel estimates.

Controllers/processors 240 and 290 control the operation at access point 110 and station 120, respectively. Memories 242 and 292 store data and program codes for access point 110 and station 120, respectively.

Wireless network 100 may support multiple transmission modes for improved performance and greater flexibility. Table 1 lists some exemplary transmission modes and their short descriptions.

TABLE 1

| Transmission Mode | Description |
| --- | --- |
| Eigensteering (ES) | M data streams are sent on M eigenmodes of a MIMO channel. |
| Spatial Spreading (SS) | M data streams are sent in parallel, with each data stream sent from all transmit antennas. |
| Direct Map (DM) | M data streams are sent from M transmit antennas, with each data stream sent from one transmit antenna. |

The ES mode may also be referred to as a steered mode, a beamforming mode, an eigen-beamforming mode, and so on. The SS mode may also be referred to as a diversity mode and so on. For simplicity, the following description assumes the use of the ES mode and the SS mode.

The downlink MIMO channel from access point 110 to station 120 may be characterized by an R×T MIMO channel response matrix H(k) for each subcarrier k. H(k) may be diagonalized with either eigenvalue decomposition or singular value decomposition to obtain S eigenmodes of H(k), where S≤min {T, R}. The eigenmodes may be viewed as orthogonal spatial channels. The singular value decomposition of H(k) may be expressed as:

$$\underline{H}(k) = \underline{U}(k) \cdot \underline{\Sigma}(k) \cdot \underline{V}^H(k), \qquad \text{Eq (1)}$$

where U(k) is an R×R unitary matrix of left singular vectors of H(k),

Σ(k) is an R×T diagonal matrix of singular values of H(k),

V(k) is a T×T unitary matrix of right singular vectors of H(k), and

"$H$" denotes a conjugate transpose.

A unitary matrix V is characterized by the property $V^H \cdot V = I$, where I is the identity matrix. The columns of V are orthogonal to one another and each column has unit power. The diagonal elements of Σ(k) are singular values that represent the channel gains of the eigenmodes of H(k).

Access point 110 may perform transmitter spatial processing as follows:

$$\underline{x}(k) = \underline{Q}(k) \cdot \underline{s}(k), \qquad \text{Eq (2)}$$

where s(k) is a T×1 vector with M data symbols to be sent on subcarrier k,

Q(k) is a T×T antenna mapping matrix for subcarrier k, and x(k) is a T×1 vector with T output symbols for T antennas on subcarrier k.

The mapping matrix may be Q(k)=V(k) for the ES mode, Q(k)=W(k) for the SS mode, and Q(k)=I for the DM mode. W(k) may be a T×T orthonormal matrix (e.g., a Walsh matrix or a Fourier matrix) that maps each data symbol to all T transmit antennas.

The received symbols at station 120 may be expressed as:

$$r(k) = \underline{H}(k) \cdot \underline{x}(k) + \underline{n}(k) \quad \text{Eq (3)}$$
$$= \underline{H}(k) \cdot \underline{Q}(k) \cdot \underline{s}(k) + \underline{n}(k)$$
$$= \underline{H}_{\text{eff}}(k) \cdot \underline{s}(k) + \underline{n}(k),$$

where $\underline{H}_{\text{eff}}(k) = \underline{H}(k) \cdot \underline{Q}(k)$ is an effective channel response matrix for subcarrier k, $\underline{r}(k)$ is an R×1 vector with R received symbols for subcarrier k, and $\underline{n}(k)$ is a vector of noise for subcarrier k.

For simplicity, the noise may be assumed to be additive white Gaussian noise (AWGN) with a zero mean vector and a covariance matrix of $\sigma_n^2 \cdot \underline{I}$, where $\sigma_n^2$ is the variance of the noise.

Station 120 may use various MIMO detection techniques to recover the data symbols sent by access point 110. These MIMO detection techniques include minimum mean square error (MMSE), zero-forcing (ZF), maximal ratio combining (MRC), maximum likelihood (ML) decoding, list sphere decoding (LSD), decision feedback equalization (DFE), and successive interference cancellation (SIC) techniques. Station 120 may derive a spatial filter matrix for each subcarrier k based on the MMSE technique, as follows:

$$\underline{M}(k) = \underline{D}(k) \cdot [\underline{H}_{\text{eff}}^H(k) \cdot \underline{H}_{\text{eff}}(k) + \sigma_n^2 \cdot \underline{I}]^{-1} \cdot \underline{H}_{\text{eff}}^H(k), \quad \text{Eq (4)}$$

where $\underline{D}(k) = [\text{diag} \{[\underline{H}_{\text{eff}}^H(k) \cdot \underline{H}_{\text{eff}}(k) + \sigma_n^2 \cdot \underline{I}]^{-1} \cdot \underline{H}_{\text{eff}}^H(k) \cdot \underline{H}_{\text{eff}}(k)\}]^{-1}$ is a diagonal matrix of scaling values used to obtain normalized estimates of the data symbols.

Station 120 may perform MIMO detection as follows:

$$\underline{\hat{s}}(k) = \underline{M}(k) \cdot \underline{r}(k) = \underline{s}(k) + \underline{\tilde{n}}(k), \quad \text{Eq (5)}$$

where $\underline{\hat{s}}(k)$ is a T×1 vector of data symbol estimates for subcarrier k, and $\underline{\tilde{n}}(k)$ is a vector of noise after the MIMO detection.

The data symbol estimates in $\underline{\hat{s}}(k)$ are estimates of the data symbols in $\underline{s}(k)$.

Equations (1) through (5) are for data transmission on the downlink from access point 110 to station 120. Data transmission on the uplink from station 120 to access point 110 may be performed in similar manner, albeit with the downlink MIMO channel response matrix in equations (1) through (5) replaced with the uplink MIMO channel response matrix.

Wireless network 100 may utilize time division duplexing (TDD). With TDD, a single frequency channel is used for both the downlink and uplink, and the MIMO channel response for one link may be assumed to be reciprocal of the MIMO channel response for the other link. That is, if $\underline{H}(k)$ is the downlink MIMO channel response, then a reciprocal channel implies that the uplink MIMO channel response may be given as $\underline{H}^T(k)$, where "$T$" denotes a transpose. However, the frequency responses of the transmit and receive chains at access point 110 are typically different from the frequency responses of the transmit and receive chains at station 120. Calibration may be performed to obtain calibration vectors used to account for differences in the frequency responses of the transmit and receive chains. After calibration, a pilot may be sent on one link and used to estimate the MIMO channel response of the other link. This reciprocity may simplify channel estimation and spatial processing. For a reciprocal channel, the right singular vectors in $\underline{V}(k)$ are steering vectors for downlink transmission, and the left singular vectors in $\underline{U}(k)$ are steering vectors for uplink transmission.

1. Mode and Rate Control

Mode and rate control may be performed independently for the downlink and uplink to achieve efficient MIMO operation. Mode and rate control for each link may entail selecting a suitable transmission mode, determining the number of data streams to transmit, and determining the rate for each data stream.

Mode selection determines which transmission mode to use for data transmission. The ES mode can typically achieve higher overall throughput and may be selected whenever possible. In one design, the ES mode is permitted for use if the following criteria are satisfied:

A transmitter station and a receiver station both support eigensteering, and

The transmitter station and the receiver station are calibrated within a predetermined time period and can take advantage of a reciprocal channel.

Even when the ES mode is permitted, the ES mode or the SS mode may be selected for use based on one or more criteria. In one design, the ES mode is selected if the following criteria are satisfied:

The age of the rates and steering vectors is less than a transition threshold $T_{ss}$, Excessive crosstalk is not observed for the data streams sent with eigensteering, Excessive packet errors are not observed for the data streams, and Calibration is valid at the transmitter and receiver stations.

The above criteria are described in further detail below. The SS mode may be selected if calibration is outdated, if insufficient or stale feedback information is available to perform eigensteering, or if performance of the ES mode is degraded. The ES mode and SS mode may also be selected based on other criteria.

Rate selection determines the number of data streams to transmit and the rate to use for each data stream. For clarity, a specific design of rate selection is described below. In this design, total throughput is computed for each possible number of data streams that may be transmitted, and the number of data streams with the highest or near highest throughput is selected.

For downlink transmission, station 120 may determine the SNR of each subcarrier for each possible number of data streams, e.g., for m=1, 2, . . . S. SNR is dependent on the MIMO detection technique used for data reception. If station 120 uses MMSE MIMO detection as shown in equations (4) and (5), then a matrix $\underline{B}_m(k)$ for m data streams may be derived as:

$$\underline{B}_m(k) = [\underline{H}_m^H(k) \cdot \underline{H}_m(k) + \sigma_n^2 \cdot \underline{I}]^{-1} \cdot \underline{H}_m^H(k) \cdot \underline{H}_m(k), \quad \text{Eq (6)}$$

where $\underline{H}_m(k) = \underline{H}(k) \cdot \underline{Q}_m(k)$ is an R×m effective channel response matrix for m data streams, and $\underline{Q}_m(k)$ is a T×m antenna mapping matrix for m data streams.

The SNR of each of the m data streams may be expressed as:

$$SNR_{m,i}(k) = 10 \cdot \log_{10}\left(\frac{b_{m,i}(k) \cdot P_{m,i}(k)}{1 - b_{m,i}(k)}\right), \text{ for } i = 1, \ldots, m, \quad \text{Eq (7)}$$

where $b_{m,i}(k)$ is the i-th diagonal element of $\underline{B}_m(k)$, $P_{m,i}(k)$ is the transmit power for data stream i in subcarrier k, and $SNR_{m,i}(k)$ is the SNR of data stream i in subcarrier k, in units of decibel (dB).

The transmit power $P_{m,i}(k)$ may be dependent on the number of data streams being sent (e.g., more transmit power per stream for fewer data streams) and the power allocation for each data stream. SNR may be computed in other manners for other MIMO detection techniques.

The average SNR of each of the m data streams may be expressed as:

$$SNR_{avg,m,i} = \frac{1}{K} \cdot \sum_{k=1}^{K} SNR_{m,i}(k), \text{ for } i = 1, \ldots, m, \quad \text{Eq (8)}$$

where K is the number of subcarriers used for data transmission, and
$SNR_{avg,m,i}$ is the average SNR for data stream i, in units of dB.

The variance of the SNRs of each of the m data streams may be computed as:

$$\sigma_{m,i}^2 = \frac{1}{K-1} \cdot \sum_{k=1}^{K} [SNR_{m,i}(k) - SNR_{avg,m,i}]^2, \quad \text{Eq (9)}$$

for $i = 1, \ldots, m$, where $\sigma_{m,i}^2$ is the SNR variance for data stream i.

In one design, an effective SNR for each of the m data streams may be computed as:

$$SNR_{eff,m,i} = SNR_{avg,m,i} - k_i \cdot \sigma_{m,i} - b_i \cdot f_m, \text{ for } i=1, \ldots, m, \quad \text{Eq (10)}$$

where $k_i$ is an adjustment factor for data stream i,
$b_i$ is a backoff factor for data stream i,
$f_m$ is a scale factor that depends on the number of data streams, and
$SNR_{eff,m,i}$ is an effective SNR for data stream i.

In one design, the adjustment factor may be set as $k_i=i$ for the ES mode and as $k_i=1$ for the spatial spreading mode. In one design, the scale factor may be set as $f_1=0.25$, $f_2=0.375$, $f_3=0.5$ and $f_4=1.0$. The various factors may also be set to other values. A single backoff factor b may be used for all data streams, or a separate backoff factor $b_i$ may be used for each data stream. In one design, a single backoff factor b is used for all data streams and is adjusted by the outer loop. In general, $k_i$ and/or $b_i$ may be adjusted by the outer loop. The backoff factor is described in further detail below.

In one design, the SNR of each active data stream being transmitted may also be derived based on the data symbol estimates for that data stream. The current transmission (e.g., current packet) includes M' active data streams, where $1 \leq M' \leq S$ and may be selected in a prior time interval. For each active data stream, the errors between the data symbol estimates and their nearest modulation symbols may be computed, scaled, and averaged. The average scaled error for each active data stream may be provided to a look-up table of SNR versus average scaled error. The look-up table may then provide an SNR estimate for each active data stream.

In one design, for the case with m=M', the effective SNR computed based on the channel estimates in equations (6) through (10) may be combined with the SNR computed based on the data symbol estimates for each active data stream, as follows:

$$SNR_{com,M',i} = \alpha_1 \cdot SNR_{eff,M',i} + \alpha_2 \cdot SNR_{mod,M',i}, \text{ for } i=1, \ldots, M', \quad \text{Eq (11)}$$

where $SNR_{mod,M',i}$ is an SNR obtained from the data symbol estimates for data stream i, $SNR_{eff,M',i}$ is an SNR obtained from the channel estimates for data stream i, $SNR_{com,M',i}$ is a combined SNR for data stream i, and $\alpha_1$ and $\alpha_2$ are weights given for $SNR_{eff,M',i}$ and $SNR_{mod,M',i}$, respectively.

The weights $\alpha_1$ and $\alpha_2$ may be determined based on the reliability of $SNR_{eff,M',i}$ and $SNR_{mod,M',i}$, respectively. In one design, $\alpha_1=\alpha_2=0.5$, and the two SNR estimates are averaged. In another design, $SNR_{mod,M',i}$ is used and $SNR_{eff,M',i}$ is discarded. $SNR_{mod,M',i}$ may be more accurate since it is derived from the data symbol estimates and includes receiver processing effects.

In one design, the wireless network supports a set of rates, and a separate rate may be independently selected for each data stream. Table 2 lists an exemplary set of 14 supported rates, which are given rate indices of 0 through 13. Each rate is associated with a specific throughput (TP), a specific code rate, a specific modulation (Mod) scheme, and a specific minimum SNR required to achieve the desired level of performance, e.g., 1% packet error rate (PER) for a non-fading, AWGN channel. The required SNR may be obtained by computer simulation, empirical measurements, and so on. A look-up table may store the supported rates and the required (Req) SNR for each supported rate. The effective SNR for each data stream may be compared against the required SNRs for the supported rates. The supported rate with the highest data rate and a required SNR that is less than or equal to the effective SNR may be selected for the data stream.

TABLE 2

| Index | TP | Code Rate | Mod Scheme | Req SNR |
|---|---|---|---|---|
| 0 | 0.0 | — | — | — |
| 1 | 0.25 | 1/4 | BPSK | −1.8 |
| 2 | 0.5 | 1/2 | BPSK | 1.2 |
| 3 | 1.0 | 1/2 | QPSK | 4.2 |
| 4 | 1.5 | 3/4 | QPSK | 6.8 |
| 5 | 2.0 | 1/2 | 16 QAM | 10.1 |
| 6 | 2.5 | 5/8 | 16 QAM | 11.7 |
| 7 | 3.0 | 3/4 | 16 QAM | 13.2 |
| 8 | 3.5 | 7/12 | 64 QAM | 16.2 |
| 9 | 4.0 | 2/3 | 64 QAM | 17.4 |
| 10 | 4.5 | 3/4 | 64 QAM | 18.8 |
| 11 | 5.0 | 5/6 | 64 QAM | 20.0 |
| 12 | 6.0 | 3/4 | 256 QAM | 24.2 |
| 13 | 7.0 | 7/8 | 256 QAM | 26.3 |

The total throughput for the m data streams may be computed as:

$$TP_{total,m} = \sum_{i=1}^{m} TP_{m,i}, \quad \text{Eq (12)}$$

where $TP_{m,i}$ is the throughput of data stream i, and
$TP_{total,m}$ is the total throughput for all m data streams.

The total throughput may be determined for each possible number of data streams, or for m=1, 2, ..., S data streams. The number of data streams with the largest total throughput may be selected, as follows:

$$M = \arg \max_{m \in \{1,\ldots,S\}} (TP_{total,m}). \quad \text{Eq (13)}$$

Alternatively, the fewest data streams with a total throughput that is within a predetermined percentage of the largest total throughput may be selected. In general, the number of data streams with the best performance may be selected, where best performance may be quantified by various criteria, two of which are given above.

In another design, the wireless network supports a set of rate combinations, which may also be called an MCS set, a vector-quantized rate set, and so on. Each rate combination is associated with a specific a number of data streams to transmit, a specific rate for each stream (which may be one of the rates in Table 2), and a specific overall throughput. One rate combination may be selected for the m data streams based on the effective or combined SNRs for these data streams. For example, the best fit between the effective or combined SNRs and the required SNRs of the various supported rate combinations may be determined. The number of data streams with the best performance may then be selected.

The rate selection provides the number of data streams (M) to transmit in an upcoming transmission (e.g., the next packet) as well as the rate for each data stream. The number of data streams and their rates may also be referred to as an MCS, a data rate vector (DRV), and so on.

In the design described above, each possible number of data streams is evaluated, and the number of data streams with the best performance is selected. In another design, a subset of the possible numbers of data streams is evaluated. For example, M' data streams as well as M'+1 data streams and/or M'−1 data streams may be evaluated to determine the best number of data streams to transmit. This design may be used, e.g., if SNRs are not available for all possible numbers of data streams, if there is insufficient time to evaluate all possible numbers of data streams, and so on. It may be desirable to send back an MCS at each feedback opportunity. In this case, as many different numbers of data streams may be evaluated as permitted by the available SNRs and time, and the MCS for the number of data streams with the best performance may be sent back. In one design, the MCS for M' data streams is determined at each feedback opportunity, and M'+1 data streams and M'−1 data streams are evaluated occasionally based on the available SNRs and time.

As shown in FIG. 2, access point 110 may transmit data to station 120 on the downlink, and station 120 may transmit data to access point 110 on the uplink. Station 120 may determine an MCS to use for the next downlink transmission based on pilot and/or data received from access point 110. Station 120 may send this MCS as DL MCS feedback to access point 110, which may then transmit data on the downlink in accordance with the DL MCS feedback. Access point 110 may determine an MCS to use for the next uplink transmission based on pilot and/or data received from station 120. Access point 110 may send this MCS as UL MCS feedback to station 120, which may then transmit data on the uplink in accordance with the UL MCS feedback. Each station may thus transmit data on one link and receive data on the other link. Each station may receive an MCS to use for data transmission to the other station and may also determine and send an MCS to be used by the other entity for data transmission.

In one design, the mode and rates to use for data transmission are adjusted based on the age of the rate and steering information. In the ES mode, data streams are processed in accordance with the MCS and further spatially processed with the steering vectors in $V(k)$ or $U(k)$. The mode and rates may be adjusted based on the age of the MCS and the age of the steering vectors. In the SS mode, data streams are processed in accordance with the MCS and further spatially processed with a known mapping matrix $W(k)$. The mode and rates may be adjusted based on the age of the MCS.

For downlink transmission in the ES mode, access point 110 may obtain $V(k)$ based on a steered pilot or an unsteered pilot from station 120. Access point 110 may estimate $H(k)$ based on an unsteered pilot from station 120 and decompose $H(k)$ to obtain $V(k)$. Alternatively, station 120 may estimate $H(k)$ based on an unsteered pilot from access point 110, decompose $H(k)$ to obtain $U(k)$, and send a steered pilot to access point 110 using $U(k)$. Access point 110 may then derive $V(k)$ based on the steered pilot from station 120. For uplink transmission in the ES mode, station 120 may obtain $U(k)$ based on a steered pilot or an unsteered pilot from access point 110. Access point 110 or station 120 may also obtain steering vectors based on explicit feedback of these steering vectors. For each link, the age of the steering vectors for that link is the difference between the time the pilot used to derive the steering vectors is sent and the time the steering vectors are used for data transmission.

Figure 3:
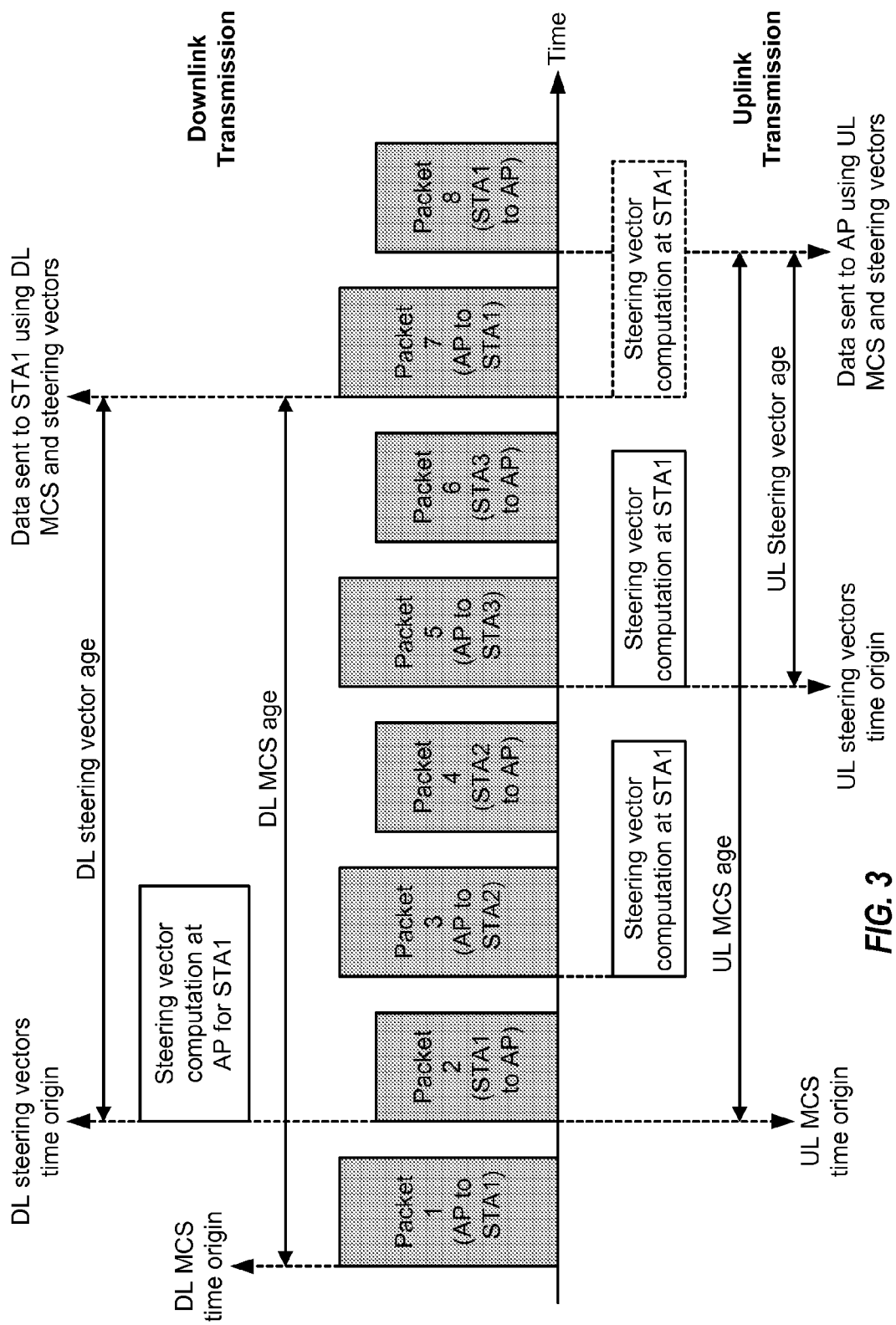
FIG. 3 illustrates determination of the age of rates and steering vectors.

FIG. 3 illustrates the determination of the age of the MCS and steering vectors for downlink transmission. In this example, access point 110 exchanges a pair of packets with station 120a (STA1), then station 120b (STA2), then station 120c (STA3), then STA1, and so on. STA1 receives packet 1, determines the DL MCS based on the received pilot and/or data, and sends DL MCS feedback as well as a pilot in packet 2. Access point 110 receives packet 2, obtains the DL MCS feedback, and computes the steering vectors for STA1 based on the received pilot. Access point 110 sends packet 7 to STA1 using the MCS and steering vectors obtained from packet 2. In one design, the age of the MCS is from packet 1 to packet 7, and the age of the steering vectors is from packet 2 to packet 7.

FIG. 3 also illustrates the determination of the age of the MCS and steering vectors for uplink transmission. Access point 110 receives packet 2, determines the UL MCS based on the received pilot and/or data, and sends UL MCS feedback as well as a pilot in packet 7. STA1 receives downlink packets 1, 3, 5, 7, and so on, and may compute steering vectors based on the pilot sent in each downlink packet. STA1 obtains the UL MCS feedback sent in packet 7. STA1 sends packet 8 to access point 110 using the MCS obtained in packet 7 and the steering vectors obtained from packet 5 (since the steering vectors from packet 7 are not ready at the start of packet 8). In one design, the age of the MCS is from packet 2 to packet 8, and the age of the steering vectors is from packet 5 to packet 8.

2. Mode and Rate Control Mechanism

Figure 4:
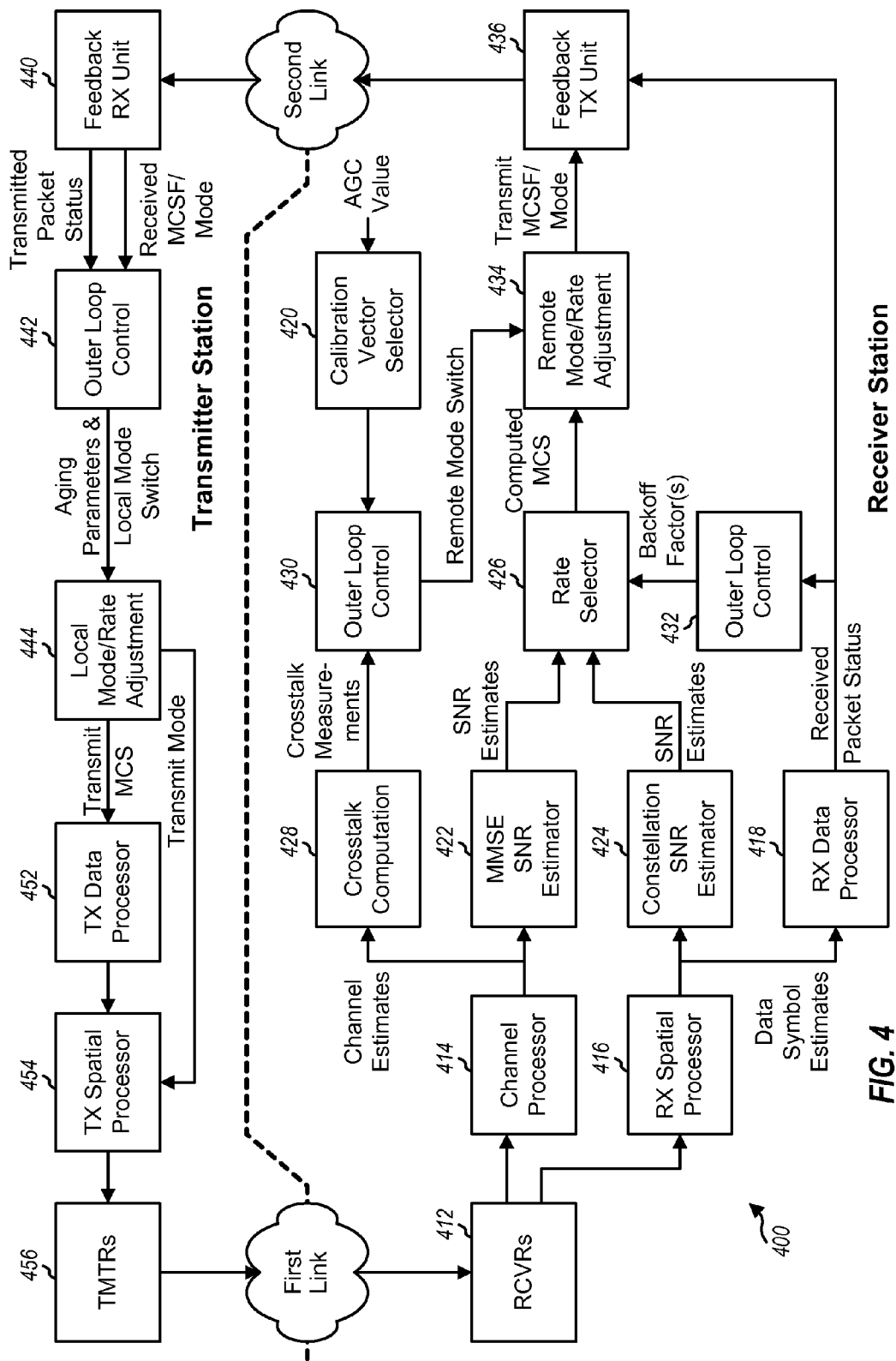
FIG. 4 shows a mode and rate control mechanism.

FIG. 4 shows a block diagram of a design of a mode and rate control mechanism 400 for data transmission from a transmitter station to a receiver station. For downlink transmission, access point 110 is the transmitter station and station 120 is the receiver station. For uplink transmission, station 120 is the transmitter station and access point 110 is the receiver station. Mode and rate control mechanism 400 includes an inner loop and an outer loop. In general, the inner loop selects the mode and rates based on current channel conditions, and the outer loop adjusts the operation of the inner loop based on average data performance.

At the receiver station, receivers 412 receive and process the data and pilot transmission from the transmitter station and provides received pilot and data symbols. A channel processor 414 processes the received pilot symbols and provides channel estimates. An RX spatial processor 416 performs MIMO detection on the received data symbols and provides data symbol estimates. An RX data processor 418 processes the data symbol estimates and provides decoded packets as well as the status of each packet (e.g., decoded correctly or in error).

For the inner loop, an SNR estimator 422 receives the channel estimates and derives SNR estimates, e.g., as shown in equations (6) and (7). An SNR estimator 424 receives the data symbol estimates and derives SNR estimates for the M' active data streams. A rate selector 426 receives the SNR estimates from units 422 and 424 and determines the number of data streams to transmit and the MCS for the data streams, as described above. The MCS determined by the receiver station is referred to as the computed MCS.

For the outer loop, a unit 432 obtains the received packet status from RX data processor 418, adjusts the backoff factor(s) used for rate selection, and provides the adjusted backoff factor(s) to rate selector 426. A unit 428 receives the channel estimates and computes the crosstalk between the streams, as described below. A selector 420 receives an automatic gain control (AGC) value for the receiver station and indicates whether calibration should be performed, as also described below. A unit 430 determines whether to switch from the ES mode to the SS mode based on the crosstalk measurement and AGC indication and provides a remote mode switch indicator to an adjustment unit 434. Unit 434 performs remote mode/rate adjustment as described below, adjusts the computed MCS from rate selector 426 if applicable, and provides MCS feedback (MCSF) and mode to send to the transmitter station, which is called the transmit MCSF/mode. A feedback TX unit 436 sends the transmit MCSF/mode and the received packet status to the transmitter station.

At the transmitter station, a feedback RX unit 440 receives the transmit MCSF/mode and the received packet status from the receiver station, which are considered as the received MCSF/mode and the transmitted packet status, respectively, at the transmitter station. A unit 442 obtains the received MCSF/mode and the transmitted packet status, determines whether to switch mode based on the received MCSF/mode and the transmitted packet status, provides aging parameters and a local mode switch indicator. An adjustment unit 444 performs local mode/rate adjustment as described below, adjusts the received MCSF if applicable, and provides the MCS and mode to use for data transmission to the receiver station, which is called the transmit MCS/mode. A timestamp may be provided for each received packet and each transmitted packet. The age of the received MCSF may be determined based on the timestamp. M data streams are processed in accordance with the transmit MCS by a TX data processor 452, spatially processed in accordance with the transmit mode by a TX spatial processor 454, and sent via transmitters 456.

3. Local Mode and Rate Adjustment

In one design, the transmitter station performs local mode and rate adjustment to determine the mode and rates to use for data transmission to the receiver station. The transmitter station may obtain a packet containing the mode and rates selected by the receiver station. The rates obtained from the receiver station may be referred to as MCS feedback (MCSF). If the MCSF is recent, then the transmitter station may transmit the next packet in accordance with the mode and rates selected by the receiver station. If the MCSF is not sufficiently recent, then the transmitter station may select another mode and/or adjust the rates. In one design, the local mode and rate adjustment may be based on the following parameters:

the age of the received rates or MCSF,
the mode selected by the receiver station, e.g., ES mode or SS mode,
the age of the steering vectors for the ES mode, and
the transmitted packet status indicative of packets transmitted in error.

The mode and rate adjustment may also be performed based on other parameters. As shown in FIG. 3, for both the downlink and uplink, the steering vectors are generally more current than the MCSF. For simplicity, the age of the steering vector may be considered to be equal to the age of the MCSF, and only the age of the MCSF may be considered.

In one design, eigensteering is permitted for a given link if calibration is completed for that link. An "ES permitted" flag may be initialized to 'false' at the start of communication, set to 'true' when calibration is completed, and set to 'false' if calibration is not performed again within a predetermined time period. Eigensteering may be permitted independently for the downlink and uplink. If eigensteering is permitted, the ES mode may be used if the MCSF is sufficiently recent (e.g., less than the transition threshold $T_{ss}$) and if other criteria are satisfied. The transmitter station may transition back and forth between the ES mode and the SS mode during operation.

Figure 5:
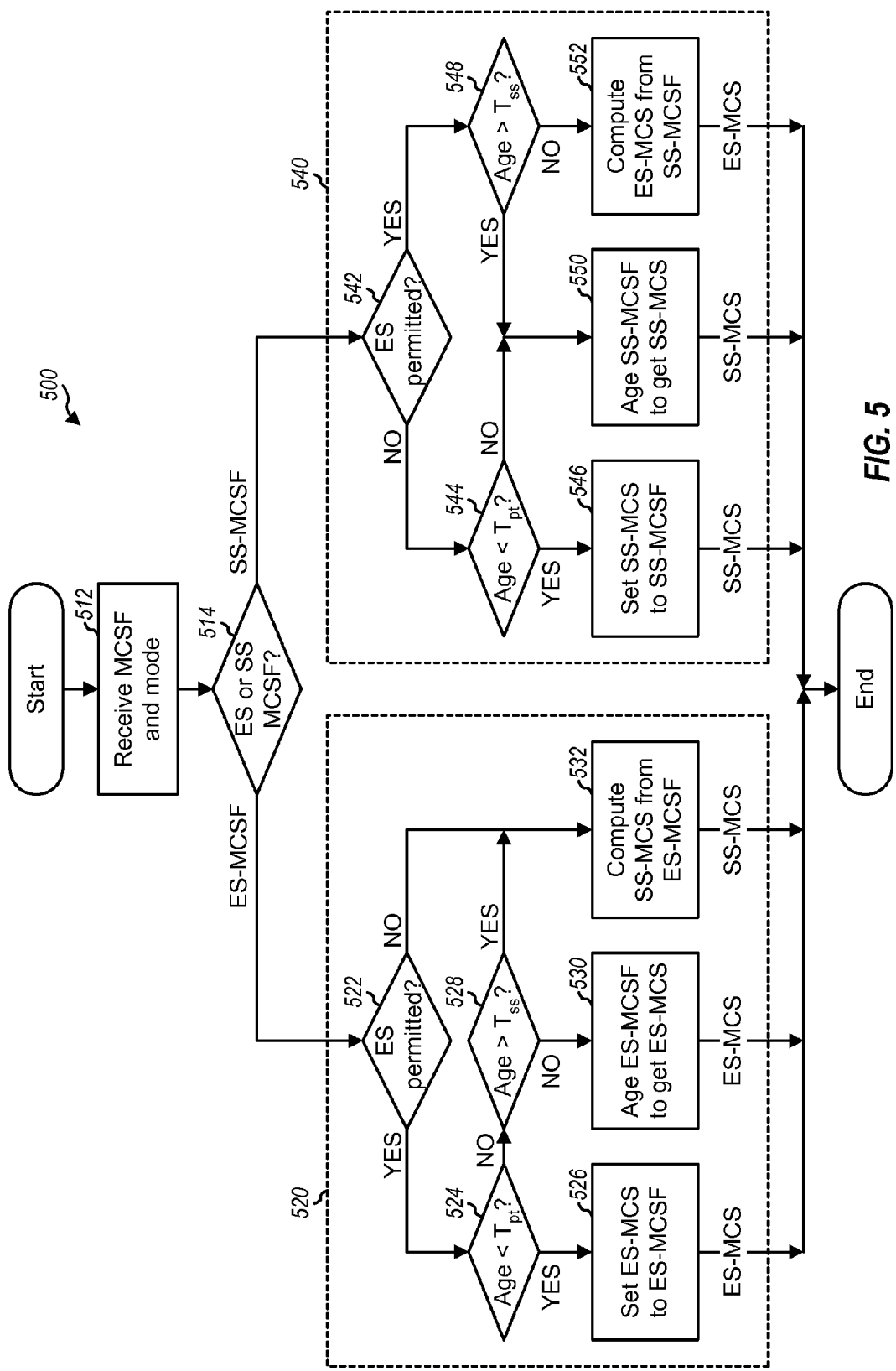
FIG. 5 shows a process for performing mode and rate adjustment.

FIG. 5 shows a design of a process 500 for performing local mode and rate adjustment. Process 500 may be performed by unit 444 in FIG. 4. The transmitter station receives the mode and MCSF from the receiver station (block 512). A determination is made whether the ES mode or SS mode is received (block 514). Block 520 is performed if the ES mode is received, and block 540 is performed if the SS mode is received.

Within block 520, a determination is made whether the ES mode is permitted (block 522). If the ES mode is permitted, then a determination is made whether the age of the MCSF is less than a pass through threshold $T_{pt}$ (block 524). If the answer is 'Yes' for block 524, then the MCSF is used directly as the MCS for eigensteering (ES-MCS) (block 526). Otherwise, a determination is made whether the age of the MCSF is greater than the transition threshold $T_{ss}$ (block 528). If the answer is 'No' for block 528, then the MCSF is adjusted based on its age, as described below, and the adjusted MCS is used for eigensteering (ES-MCS) (block 530). If the ES mode is not permitted ('No' for block 522) or if the age of the MCSF exceeds $T_{ss}$, then the SS mode is selected, and an MCS for spatial spreading (SS-MCS) is computed based on the MCSF, as described below (block 532).

Within block 540, a determination is made whether the ES mode is permitted (block 542). If the ES mode is not permitted (e.g., because calibration is not completed), then a determination is made whether the age of the MCSF is less than the pass through threshold $T_{pt}$ (block 544). If the answer is 'Yes' for block 544, then the MCSF is used directly as the MCS for spatial spreading (SS-MCS) (block 546). Otherwise, the MCSF is adjusted based on its age, as described below, and the adjusted MCS is used for spatial spreading (SS-MCS) (block 550). If the ES mode is permitted ('Yes' for block 542), then a determination is made whether the age of the MCSF is greater than $T_{ss}$ (block 548). If the answer is 'Yes' for block 548, then a switch to the ES mode is not made, and the MCSF is adjusted and used for spatial spreading (block 550). Otherwise, the ES mode is selected, and an MCS for eigensteering (ES-MCS) is computed based on the MCSF, as described below (block 552).

In the design shown in FIG. 5, rate adjustment is performed in blocks 530 and 550, ES-to-SS rate conversion is performed in block 532, and SS-to-ES rate conversion is performed in block 552. Table 3 lists exemplary parameters used for rate adjustment and rate conversion. Each "X" in the last three columns indicates where a given parameter is used.

TABLE 3

| Parameter | Description | Rate Adj | SS-to-ES | ES-to-SS |
|---|---|---|---|---|
| $T_{sd}$ (M, i, Mode) | Stream drop time as a function of the number of streams M, stream index i, and transmission mode. | X | | |
| $Q_{snr}$ (M, i, Mode) | SNR derating factor due to age. | X | X | X |
| $B_{ss}$ | ES-to-SS backoff factor to account for lower capacity in SS than ES. | | | X |
| $D_{snr}$ | Difference in SNR of an eigenmode to shut down the eigenmode. | | X | |
| $A_i$ | SS-to-ES SNR adjustment for data stream i. | | | X |

$T_{sd}$ (M, i, Mode) indicates an age threshold to drop data stream i when M data streams are to be sent using Mode. If the age of the MCSF exceeds $T_{sd}$ (M, i, Mode), then data stream i is dropped. For a given combination of M and Mode, the age threshold is generally lower for later values of i, so that stream M is dropped first, stream M-1 is dropped next, and so on, and stream 2 is dropped last. Stream 1 is not dropped so that at least one stream is transmitted. The stream drop times may be selected to provide good performance.

$Q_{snr}$ (M, i, Mode) indicates the rate at which the SNR of data stream i is reduced due to the MCSF age when M data streams are to be sent using Mode. $Q_{snr}$ (M, i, Mode) does not depend on stream index i for the SS mode.

Rate adjustment is performed in blocks 530 and 550 to adjust the rates in the MCSF based on the age of the MCSF. In one design, the rate adjustment is performed as follows. First, the age of the MCSF is compared against the $T_{sd}$ (M, i, Mode) thresholds for data streams 2 through M. For each data stream i, the rate for that stream is set to zero if the MCSF age exceeds the $T_{sd}$ (M, i, Mode) threshold for that stream, which disables the stream.

For each data stream that is not dropped, the required SNR for the rate in the MCSF is determined from the rate look-up table. The required SNR is reduced based on the MCSF age, as follows:

$$SNR_{adj,i} = SNR_{req,i} - (MCSF\ age) \cdot Q_{snr}(M,i,Mode), \quad \text{Eq (14)}$$

where $SNR_{req,i}$ is a required SNR for data stream i from the rate in the MCSF, and $SNR_{adj,i}$ is an adjusted SNR for data stream i.

The adjusted SNR for each data stream is provided to the rate look-up table to obtain an adjusted rate for the data stream. The first data stream has an adjusted rate that is equal to or greater than the lowest rate. The adjusted rate for each remaining data stream may be zero or non-zero depending on the adjusted SNR. Data is sent at the adjusted rates.

ES-to-SS rate conversion is performed in blocks 532 to convert the rates received in the MCSF for the ES mode to rates for the SS mode. In one design, the ES-to-SS rate conversion is performed as follows. First, the number of data streams is limited to min {T, R−1}, and any data stream above this maximum number is dropped. For each data stream that is not dropped, the required SNR for the rate in the MCSF is determined from the rate look-up table. Any data stream with a required SNR that is more than $D_{snr}$ dB below the required SNR of the first data stream is turned off. The number of data streams not turned off is $\tilde{M}$, where $\tilde{M} \leq M$ and M is the number of data streams in the MCSF. The required SNRs of the $\tilde{M}$ data streams may be averaged to obtain an average SNR, $SNR_{avg}$, which is a rough estimate of the average capacity. Alternatively, the required SNRs may be converted to capacities, averaged, and then converted back to average SNR. The average SNR is then reduced based on the MCSF age, as follows:

$$SNR_{adj} = SNR_{avg} - (MCSF\ age) \cdot Q_{snr}(M,SS\ Mode) - B_{ss}, \quad \text{Eq (15)}$$

where $SNR_{adj}$ is an adjusted SNR for the SS mode. The adjusted SNR is provided to the rate look-up table to obtain a final rate. $\tilde{M}$ data streams are sent at the final rate with spatial spreading.

SS-to-ES rate conversion is performed in block 552 to convert the rates received in the MCSF for the SS mode to rates for the ES mode. In one design, the SS-to-ES rate conversion is performed as follows. First, the required SNR for each data stream is determined based on the rate in the MCSF for that data stream. The required SNRs of the M data streams are averaged to obtain an average SNR, $SNR_{ave}$. An adjusted SNR is then obtained for each data stream, as follows:

$$SNR_{adj,i} = SNR_{ave} - (MCSF\ age) \cdot Q_{snr}(M,SS\ Mode) - A_i, \quad \text{Eq (16)}$$

where $SNR_{adj,i}$ is an adjusted SNR for data stream i. $A_i$ may be positive or negative for the first data stream but is typically positive for each remaining data stream. The adjusted SNR for each data stream is provided to the rate look-up table to obtain an adjusted rate for the data stream, which may be zero or non-zero. $\tilde{M}$ data streams are sent at the adjusted rates with eigensteering.

4. Remote Mode and Rate Adjustment

In one design, the receiver station may perform remote mode and rate adjustment on the mode and rates to send back to the transmitter station. The receiver station typically sends the computed MCS directly to the transmitter station. However, there may be situations in which the mode and/or rates should be adjusted.

In one design, the receiver station switches from the ES mode to the SS mode if crosstalk measurement indicates that the SS mode may improve performance. To derive the MMSE spatial filter matrix, the receiver station computes the product $H_{eff}^H(k) \cdot H_{eff}(k)$. If the steering vectors match the MIMO channel response, then this product is equal to a diagonal matrix $\Lambda(k) = \Sigma^T(k) \cdot \Sigma(k)$. Hence, the power of the off-diagonal terms relative to the power of the diagonal terms is indicative of the amount of crosstalk. A crosstalk measurement may be computed as:

$$C = \frac{\sum_{k=1}^{K} \sum_{i=1}^{R} |\lambda_{i,i}(k)|^2}{\sum_{k=1}^{K} \sum_{i=1}^{R} \sum_{j \neq i} |\lambda_{i,j}(k)|^2}, \quad \text{Eq (17)}$$

where $\lambda_{i,j}(k)$ is the (i, j) element of $H_{eff}^H(k) \cdot H_{eff}(k)$.

The SS mode may be selected if the crosstalk measurement exceeds a crosstalk threshold, e.g., once or repeatedly. Crosstalk on a single packet may be poor due to various factors such as channel effects, ramp up after an interval of no transmission, and so on. To avoid these effects, ES-to-SS transition may be triggered based on crosstalk observed over a number of packets. Whenever ES-to-SS transition occurs, an MCS computed for eigensteering may be converted to an MCS for spatial spreading, as described above. The ES-to-SS transitions provide some feedback on the performance of eigensteering. The transmitter station may send packets with eigensteering but may frequently receive MCS for spatial spreading, even with relatively fresh steering vectors. This may indicate errors in the transmit and receive chains, and calibration may be performed.

5. Outer Loop Operation

In one design, the outer loop monitors data performance and adjusts the mode and rate selection accordingly. As shown in FIG. 4, the transmitter station may perform some outer loop functions, and the receiver station may perform other outer loop functions. The outer loop may receive information such as received packet status (available at the receiver station), transmitted packet status (available at the transmitter station), crosstalk measurement, AGC information, and so on. The outer loop may adjust the operation of various units based on the available information.

In one design, the outer loop adjusts backoff factor b which is used for rate selection in equation (10), based on received packet status, as follows:

$$b_i = \begin{cases} b_i + \Delta_{up,i} & \text{if packet is decoded in error} \\ b_i - \Delta_{dn,i} & \text{if packet is decoded correctly} \end{cases} \quad \text{Eq (18)}$$

where $\Delta_{up,i}$ and $\Delta_{dn,i}$ are up and down step sizes, respectively. The magnitude of the step sizes determines the convergence speed. The ratio of the steps sizes may be selected based on the desired packet error rate.

In one design, aging parameters (e.g., some or all of the parameters in Table 3) are determined and/or adjusted based on data performance. In one design, the MCSF age for each transmitted packet is saved, packets requiring retransmission (or erased packets) are tagged, and statistics of erased packets are examined to determine the aging parameters, e.g., to determine if the SNR derating factor is excessive or inadequate based on the packet errors. Error rates for packets sent before transition to the SS mode may be observed to determine whether this transition is too early or too late. The aging parameters may also be determined by observing packet-to-packet variations in the channel characteristics. In general, the aging parameters may be fixed values (e.g., determined based on computer simulation, empirical measurements, etc) or adjustable values.

In one design, the outer loop selects the SS mode if excessive crosstalk is observed while in the ES mode. Excessive crosstalk may be declared, e.g., if the crosstalk measurement exceeds the crosstalk threshold for L consecutive packets (or L out of L' packets) sent with eigensteering. Access point 110 may determine whether excessive crosstalk is observed for each link to each station.

In one design, calibration is performed periodically to ensure proper operation. A timer may be set to a predetermined value (which may be selectable), and calibration may be initiated at a convenient time after the timer expires. In another design, calibration is triggered by the AGC value at the receiver station. The frequency response of the receivers may vary with AGC value. Calibration may be performed if the current AGC value is substantially different than AGC values for which calibration has been performed. The AGC value may be deemed substantially different if it is outside of an AGC range. In yet another design, calibration is initiated based on ES-to-SS transitions at the receiver station. The transmitter station may identify these ES-to-SS transitions by reception of SS-MCSFs even though packets are sent with eigensteering. Calibration may be performed, e.g., if $N_{tr}$ SS-MCSFs are received within a window of $N_{tot}$ packets sent with eigensteering.

6. Mode and Rate Control

A local station (e.g., access point 110 or station 120) may transmit data to and receive data from a remote station. The local station may be both a transmitter station for a data transmission sent to the remote station as well as a receiver station for a data transmission sent by the remote station. The local station may perform mode and rate selection and remote adjustment of the MCSF and mode sent to the remote station, which are used for data transmission to the local station. The local station may also perform local adjustment of the MCSF and mode received from the remote station, which are used for data transmission to the remote station.

Figure 6:
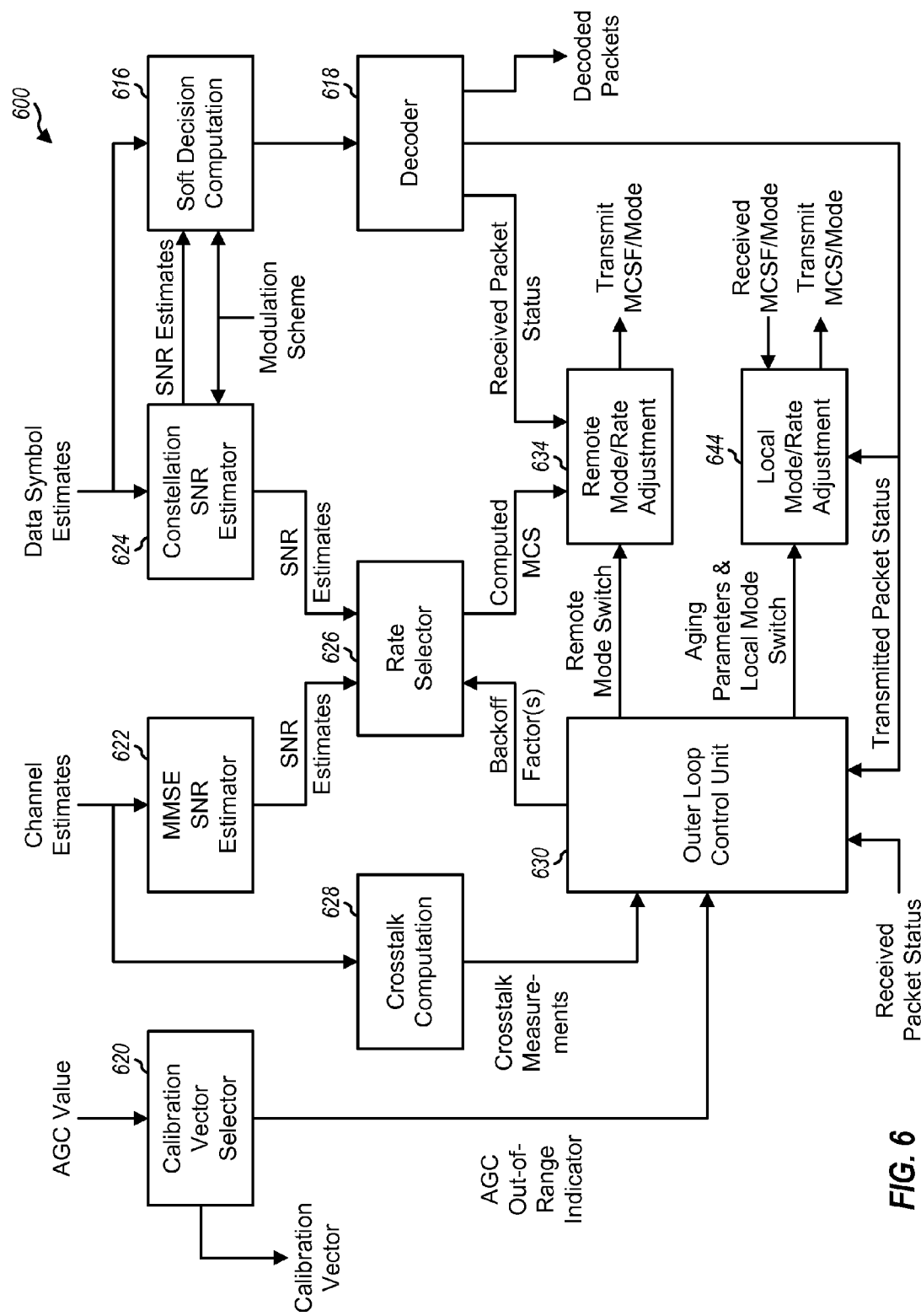
FIG. 6 shows a mode and rate selector at a local station.

FIG. 6 shows a block diagram of a design of a mode and rate selector 600 at a local station communicating with a remote station. Selector 600 may be implemented, e.g., by processor 240 at access point 110 and/or processor 290 at station 120 in FIG. 2.

Within selector 600, an SNR estimator 622 receives channel estimates and derives SNR estimates. An SNR estimator 624 receives data symbol estimates and derives SNR estimates for the M' active data streams. A rate selector 626 receives the SNR estimates from units 622 and 624 and provides the computed MCS. An adjustment unit 634 performs remote mode/rate adjustment of the computed MCS based on a remote mode switch indicator from a control unit 630 and possibly the received packet status from decoder 618 and provides the transmit MCSF/mode. An adjustment unit 644 performs local mode/rate adjustment of the received MCSF from the remote station based on aging parameters and a local mode switch indicator from control unit 630 and possibly the transmitted packet status/retransmit count from decoder 618 and provides the transmit MCS/mode.

A selector 620 receives the current AGC value and provides a calibration vector for the nearest AGC value. Selector 620 also indicates if the current AGC value is outside of an AGC range, which may trigger a switch to the SS mode and/or calibration. A unit 628 receives the channel estimates and computes the crosstalk. Control unit 630 performs outer loop functions for data transmission on both links. Unit 630 receives the AGC indication from selector 620, crosstalk measurement from unit 628, transmitted packet status, and received packet status. Control unit 630 adjusts and provides backoff factor(s) to rate selector 630, provides the remote mode switch indicator to adjustment units 634, and adjusts and provides the aging parameters and the local mode switch indicator to adjustment unit 644.

An RX data processor may include a unit 616 and a decoder 618. Unit 616 determines soft decisions (e.g., log-likelihood ratios) for the data symbol estimates based on the SNR estimates for the active data streams and in accordance with the modulation scheme used for data transmission. Decoder 618 decodes the soft decisions and provides decoded packets and received packet status for the data transmission sent from the remote station to the local station. Decoder 618 also provides transmitted packet status indicative of packets transmitted in error from the local station to the remote station.

Figure 7:
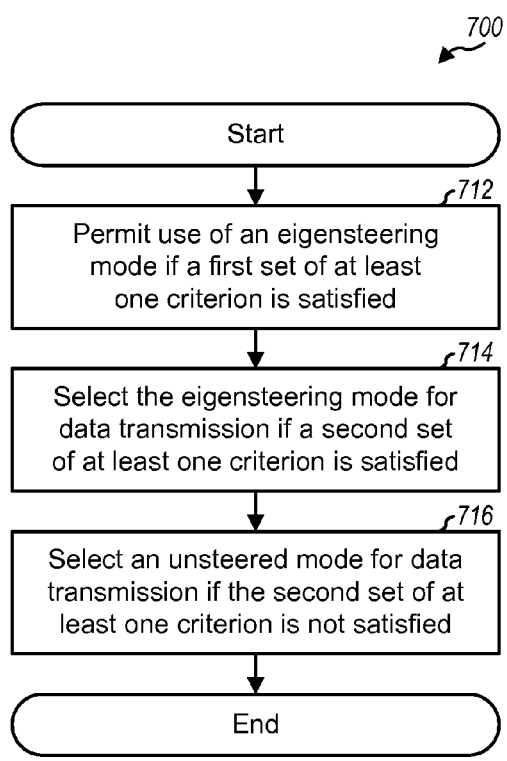
FIG. 7 shows a process for performing mode selection.

FIG. 7 shows a design of a process 700 for performing mode selection. Process 700 may be performed by the transmitter station and/or the receiver station. The use of an eigensteering mode is permitted if a first set of at least one criterion is satisfied (block 712). The first set of at least one criterion may be satisfied, e.g., if eigensteering is supported by the transmitter and receiver stations and if calibration is performed within a predetermined time period. The eigensteering mode is selected for data transmission if a second set of at least one criterion is satisfied (block 714). An unsteered mode is selected for data transmission if the second set of at least one criterion is not satisfied (block 716). The unsteered mode may be a spatial spreading mode, a direct map mode, or some other mode that does not use eigensteering. The second set of at least one criterion may not be satisfied and the unsteered mode may be selected, e.g., if any one of the following occurs (1) the age of information (e.g., rates and steering vectors) used for data transmission with eigensteering exceeds an age threshold, (2) packet errors for data transmission with eigensteering exceed a limit, (3) crosstalk among multiple data streams sent with eigensteering exceeds a crosstalk threshold, or (4) an AGC value is outside a predetermined range.

Figure 8:
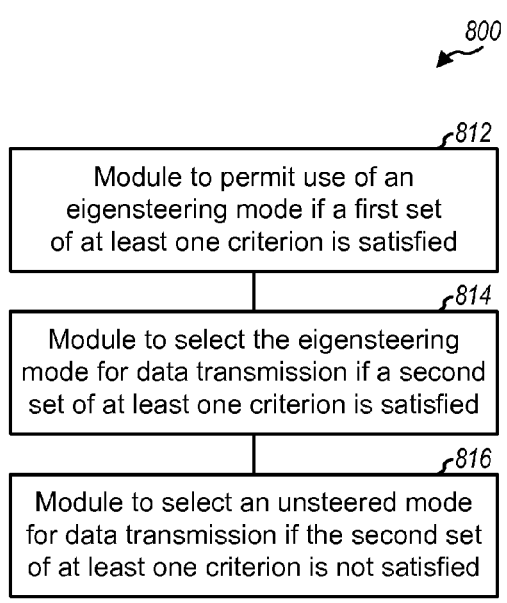
FIG. 8 shows an apparatus for performing mode selection.

FIG. 8 shows a design of an apparatus 800 for performing mode selection. Apparatus 800 includes means for permitting the use of an eigensteering mode if a first set of at least one criterion is satisfied (module 812), means for selecting the eigensteering mode for data transmission if a second set of at least one criterion is satisfied (module 814), and means for selecting an unsteered mode for data transmission if the second set of at least one criterion is not satisfied (module 816).

FIG. 9 shows a design of a process 900 for performing mode and rate selection, e.g., at the receiver station. SNR estimates are derived for data streams to potentially transmit (block 912). Depending on processing capability, a subset or all possible numbers of data streams may be evaluated. The SNR estimates may be derived based on channel estimates for the data streams to potentially transmit and/or data symbol estimates for active data stream(s). The number of data streams to transmit and at least one rate for at least one data stream to transmit are selected based on the SNR estimates and at least one backoff factor (block 914). The at least one backoff factor is adjusted based on status of received packets (block 916).

An eigensteering mode is selected if at least one criterion is satisfied, and an unsteered mode may be selected otherwise. If the at least one rate is derived for the eigensteering mode and if the unsteered mode is selected, then the at least one rate for the eigensteering mode may be converted to at least one rate for the unsteered mode. The rate and mode selection may be performed for each packet received from the transmitter station.

FIG. 10 shows a design of an apparatus 1000 for performing mode and rate selection. Apparatus 1000 includes means for deriving SNR estimates for data streams to potentially transmit (module 1012), means for selecting the number of data streams to transmit and at least one rate for at least one data stream to transmit based on the SNR estimates and at least one backoff factor (module 1014), and means for adjusting the at least one backoff factor based on status of received packets (module 1016).

FIG. 11 shows a design of a process 1100 for performing rate adjustment, e.g., at the transmitter station. Rate information indicative of at least one rate to use for data transmission from the transmitter station to the receiver station is obtained (block 1112). The at least one rate is adjusted based on the age of the rate information (block 1114). The at least one adjusted rate is used for data transmission (block 1116).

For block 1114, the at least one rate may be provided directly as the at least one adjusted rate if the age of the rate information is less than a first threshold. The age of the rate information may be compared against at least one drop threshold. The number of data streams may be reduced if the age of the rate information exceeds any one of the at least one drop threshold. For rate aging, the at least one rate is converted to at least one SNR, which is adjusted by an amount determined by the age of the rate information and an SNR derating factor. The at least one adjusted SNR is then converted to the at least one adjusted rate.

Rate conversion may also be performed. The at least one rate may be for the eigensteering mode, and the at least one adjusted rate may be for the unsteered mode if the age of the rate information exceeds a second threshold. The at least one rate may be for the unsteered mode, and the at least one adjusted rate may be for the eigensteering mode if eigensteering is permitted and if the age of the rate information is less than the second threshold.

FIG. 12 shows a design of an apparatus 1200 for performing rate adjustment. Apparatus 1200 includes means for obtaining rate information indicative of at least one rate to use for data transmission from the transmitter station to the receiver station (module 1212), means for adjusting the at least one rate based on the age of the rate information (module 1214), and means for using the at least one adjusted rate for data transmission (module 1216).

The modules in FIGS. 8, 10 and 12 may comprise processors, electronics devices, hardware devices, electronics components, logical circuits, memories, etc., or any combination thereof.

The techniques described herein may be implemented by various means. For example, these techniques may be implemented in hardware, firmware, software, or a combination thereof. For a hardware implementation, the processing units used to perform mode and rate selection/adjustment may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software instructions may be stored in a memory (e.g., memory 242 or 292 in FIG. 2) and executed by a processor (e.g., processor 240 or 290). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

Headings are included herein for reference and to aid in locating certain sections. These headings are not intended to limit the scope of the concepts described therein under, and these concepts may have applicability in other sections throughout the entire specification.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

We claim:
1. An apparatus, comprising:
at least one processor configured to:
obtain rate information indicative of at least one rate to use for data transmission from a transmitter station to a receiver station,
use the at least one rate for data transmission if the age of the rate information is less than a threshold;

adjust the at least one rate based on an age of the rate information and use the at least one adjusted rate for data transmission if the age of the rate information is greater than the threshold; and a memory coupled to the at least one processor.

2. The apparatus of claim 1, wherein the at least one processor is further configured to receive the rate information from the receiver station.

3. The apparatus of claim 1, wherein the at least one processor is further configured to compare the age of the rate information against at least one second threshold and to reduce a number of data streams if the age of the rate information exceeds any one of the at least one second threshold.

4. The apparatus of claim 1, wherein the at least one processor is further configured to:

convert the at least one rate to at least one signal-to-noise ratio (SNR), adjust the at least one SNR based on the age of the rate information, and convert the at least one adjusted SNR to the at least one adjusted rate.

5. The apparatus of claim 4, wherein the at least one processor is further configured to determine an amount of adjustment for the at least one SNR based on the age of the rate information and an SNR derating factor.

6. The apparatus of claim 1, wherein the at least one processor is further configured to receive the at least one rate for an eigensteering mode and to derive the at least one adjusted rate for an unsteered mode if the age of the rate information exceeds the threshold.

7. The apparatus of claim 1, wherein the at least one processor is further configured to receive the at least one rate for an unsteered mode and to derive the at least one adjusted rate for an eigensteering mode if eigensteering is permitted and if the age of the rate information is less than a third threshold.

8. A method, comprising:

obtaining rate information indicative of at least one rate to use for data transmission from a transmitter station to a receiver station;

using the at least one rate for data transmission if the age of the rate information is less than a threshold;

adjusting the at least one rate based on an age of the rate information and using the at least one adjusted rate for data transmission if the age of the rate information is greater than the threshold.

9. The method of claim 8, wherein the obtaining the rate information comprises receiving the rate information from the receiver station.

10. The method of claim 8, wherein the adjusting the at least one rate comprises adjusting the rate if the age of the rate information is less than a second threshold.

11. The method of claim 8, wherein the adjusting the at least one rate comprises:

comparing the age of the rate information against at least one third threshold, and reducing a number of data streams if the age of the rate information exceeds any one of the at least one third threshold.

12. The method of claim 8, wherein the adjusting the at least one rate comprises:

converting the at least one rate to at least one signal-to-noise ratio (SNR), adjusting the at least one SNR based on the age of the rate information, and converting the at least one adjusted SNR to the at least one adjusted rate.

13. The method of claim 12, wherein the adjusting the least one SNR comprises adjusting the at least one SNR based on the age of the rate information and an SNR derating factor.

14. The method of claim 8, wherein the adjusting the at least one rate comprises:

receiving the at least one rate for a first transmission mode; and converting the at least one rate for the first transmission mode to the at least one adjusted rate for a second transmission mode.

15. The method of claim 14, wherein the receiving the at least one rate comprises receiving the at least one rate for an eigensteering mode and the converting the at least one rate comprises obtaining the at least one adjusted rate for an unsteered mode if the age of the rate information exceeds the threshold.

16. The method claim 14, wherein the receiving the at least one rate comprises receiving the at least one rate for an unsteered mode and the converting the at least one rate comprises obtaining the at least one adjusted rate for an eigensteering mode if eigensteering is permitted and if the age of the rate information is less than a fourth threshold.

17. An apparatus, comprising:

means for obtaining rate information indicative of at least one rate to use for data transmission from a transmitter station to a receiver station;

means for using the at least one rate for data transmission if the age of the rate information is less than a threshold;

means for adjusting the at least one rate based on an age of the rate information and using the at least one adjusted rate for data transmission if the age of the rate information is greater than the threshold.

18. The apparatus of claim 17, wherein the means for obtaining the rate information comprises means for receiving the rate information from the receiver station.

19. The apparatus of claim 17, wherein the means for adjusting the at least one rate comprises means for adjusting the at least one rate if the age of the rate information is less than a second threshold.

20. The apparatus of claim 17, wherein the means for adjusting the at least one rate comprises:

means for comparing the age of the rate information against at least one third threshold, and means for reducing a number of data streams if the age of the rate information exceeds any one of the at least one third threshold.

21. The apparatus of claim 17, wherein the means for adjusting the at least one rate comprises:

means for converting the at least one rate to at least one signal-to-noise ratio (SNR), means for adjusting the at least one SNR based on the age of the rate information, and means for converting the at least one adjusted SNR to the at least one adjusted rate.

22. The apparatus of claim 21, wherein the means for adjusting the at least one SNR comprises means for adjusting the least one SNR based on the age of the rate information and an SNR derating factor.

23. The apparatus of claim 17, wherein the means for adjusting the at least one rate comprises:

means for receiving the at least one rate for a first transmission mode, and means for converting the at least one rate for the first transmission mode to the at least one adjusted rate for a second transmission mode.

24. The apparatus of claim 23, wherein the means for receiving the at least one rate comprises means for receiving the at least one rate for an eigensteering mode and the means for converting the at least one rate comprises means for obtaining the at least one adjusted rate for an unsteered mode if the age of the rate information exceeds the threshold.

25. The apparatus of claim 23, wherein the means for receiving the at least one rate comprises means for receiving the at least one rate for an unsteered mode and the means for converting the at least one rate comprises means for obtaining the at least one adjusted rate for an eigensteering mode if eigensteering is permitted and if the age of the rate information is less than a fourth threshold.

26. A non-transitory computer-readable medium including instructions stored thereon, the instructions executable by one or more processors for:
   obtaining rate information indicative of at least one rate to use for data transmission from a transmitter station to a receiver station;
   using the at least one rate for data transmission if the age of the rate information is less than a threshold;
   adjusting the at least one rate based on an age of the rate information and using the at least one adjusted rate for data transmission if the age of the rate information is greater than the threshold.

27. The computer-readable medium of claim 26, wherein the instructions for obtaining rate information comprises instructions for receiving the rate information from the receiver station.

28. The computer-readable medium of claim 26, wherein the instructions for adjusting the at least one rate comprises instructions for adjusting the rate if the age of the rate information is less than a second threshold.

29. The computer-readable medium of claim 26, wherein the instructions for adjusting the at least one rate comprises instructions for:
   comparing the age of the rate information against at least one third threshold, and
   reducing a number of data streams if the age of the rate information exceeds any one of the at least one third threshold.

30. The computer-readable medium of claim 26, wherein the instructions for adjusting the at least one rate comprises instructions for:
   converting the at least one rate to at least one signal-to-noise ratio (SNR),
   adjusting the at least one SNR based on the age of the rate information, and
   converting the at least one adjusted SNR to the at least one adjusted rate.

31. The computer-readable medium of claim 30, wherein the instructions for adjusting the at least one SNR comprises instructions for adjusting the at least one SNR based on the age of the rate information and an SNR derating factor.

32. The computer-readable medium of claim 26, wherein the instructions for adjusting the at least one rate comprises instructions for:
   receiving the at least one rate for a first transmission mode; and
   converting the at least one rate for the first transmission mode to the at least one adjusted rate for a second transmission mode.

33. The computer-readable medium of claim 32, wherein the instructions for receiving the at least one rate comprises instructions for receiving the at least one rate for an eigensteering mode and the instructions for converting the at least one rate comprises instructions for obtaining the at least one adjusted rate for an unsteered mode if the age of the rate information exceeds the threshold.

34. The computer-readable medium claim 32, wherein the instructions for receiving the at least one rate comprises instruction for receiving the at least one rate for an unsteered mode and the instructions for converting the at least one rate comprises instructions for obtaining the at least one adjusted rate for an eigensteering mode if eigensteering is permitted and if the age of the rate information is less than a fourth threshold.

* * * * *